US008940172B2

(12) United States Patent
Ma et al.

(10) Patent No.: US 8,940,172 B2
(45) Date of Patent: Jan. 27, 2015

(54) SUPER-MACROPOROUS POLYMERIC MICROSPHERES AND PREPARATION METHOD THEREOF

(75) Inventors: Guanghui Ma, Beijing (CN); Zhiguo Su, Beijing (CN); Weiqing Zhou, Beijing (CN); Qiang Wei, Beijing (CN)

(73) Assignee: Institute of Process Engineering, Chinese Academy of Sciences, Beijing (CN)

( * ) Notice: Subject to any disclaimer, the term of this patent is extended or adjusted under 35 U.S.C. 154(b) by 1071 days.

(21) Appl. No.: 12/516,553

(22) PCT Filed: Dec. 1, 2006

(86) PCT No.: PCT/CN2006/003242
§ 371 (c)(1),
(2), (4) Date: May 27, 2009

(87) PCT Pub. No.: WO2008/064525
PCT Pub. Date: Jun. 5, 2008

(65) Prior Publication Data
US 2010/0065500 A1  Mar. 18, 2010

(51) Int. Cl.
*B01J 20/30* (2006.01)
*B01J 31/06* (2006.01)
(Continued)

(52) U.S. Cl.
CPC .................. *C08F 2/18* (2013.01); *B01J 31/063* (2013.01); *B01J 2220/54* (2013.01); *B01J 20/3064* (2013.01); *B01J 20/285* (2013.01); *B01J 20/28085* (2013.01); *B01J 20/28004* (2013.01)
USPC ...... 210/635; 210/656; 210/198.2; 210/502.1

(58) Field of Classification Search
CPC ................ B01J 20/28004; B01J 20/28085; B01J 20/285; B01J 31/063; B01J 20/3064; B01J 2220/54; C08F 2/18
USPC ........................... 210/656, 635, 198.2, 502.1
See application file for complete search history.

(56) References Cited

U.S. PATENT DOCUMENTS 3,409,691 A * 11/1968 Small ............................ 585/824
3,418,262 A * 12/1968 Werotte et al. ................. 521/32
(Continued)

FOREIGN PATENT DOCUMENTS

CN  1150764 A  5/1997
CN  1318588 A  10/2001
(Continued)

OTHER PUBLICATIONS

Sederel et al., "Styrene-Divinylbenzene Copolymers, Construction of Porosity in Styrene Divinylbenzene Matrices", Journal of Applied Polymer Science, vol., 17, pp. 2835-2846 (1973).
(Continued)

*Primary Examiner* — Ernest G Therkorn
(74) *Attorney, Agent, or Firm* — Knobbe, Martens, Olson & Bear, LLP

(57) ABSTRACT

The invention provides a preparation method of super-macroporous polymeric microspheres and a product thereof. The method is characterized in that adding high content of surfactant into an oil phase containing a monomer and dispersing the oil phase containing the monomer and the surfactant into an aqueous phase. Super-macroporous microspheres are obtained by means of suspension polymerization. In the interior of the microspheres, 10-60% of the pores are distributed in a range of 500-900 nm. The microspheres have a particle diameter of 1-200 μm and a porosity of 30%-90%. The product is suitable for being used as a stationary phase matrix in liquid chromatography, a carrier for high performance catalysts and a high performance adsorbent, and especially, being used as a separation medium for separating biomacromolecules.

21 Claims, 8 Drawing Sheets

(51) Int. Cl.
*C08F 2/18* (2006.01)
*B01J 20/285* (2006.01)
*B01J 20/28* (2006.01)

(56) References Cited

U.S. PATENT DOCUMENTS

| | | | | |
|---|---|---|---|---|
| 3,627,708 | A | * 12/1971 | Morse et al. | 521/63 |
| 4,522,953 | A | 6/1985 | Barby et al. | |
| 4,895,662 | A | * 1/1990 | Stevens | 210/692 |
| 5,019,270 | A | 5/1991 | Afeyan et al. | |
| 5,228,989 | A | 7/1993 | Afeyan et al. | |
| 5,328,936 | A | * 7/1994 | Leifholtz et al. | 521/65 |
| 5,583,162 | A | 12/1996 | Li et al. | |
| 5,653,922 | A | 8/1997 | Li et al. | |
| 5,833,861 | A | 11/1998 | Afeyan et al. | |
| 5,863,957 | A | 1/1999 | Li et al. | |
| 6,100,306 | A | 8/2000 | Li et al. | |
| 6,323,249 | B1 | * 11/2001 | Dale et al. | 521/38 |
| 2003/0191205 | A1 | * 10/2003 | Markowitz et al. | 521/99 |

FOREIGN PATENT DOCUMENTS

| | | |
|---|---|---|
| EP | 0448391 A2 | 9/1991 |
| EP | 0 610 039 A1 | 8/1994 |
| GB | 1 483 587 | 8/1977 |

OTHER PUBLICATIONS

Zhang et al., "Cooperation of solid granule and solvent as porogenic agents Novel porogenic mode of biporous media for protein chromatography", Journal of Chromatography A, 922 (2001) 77-86.

Zhang et al., "Poly(glycidyl methacrylate-divinylbenzene-triallylisocyanurate) continuous-bed protein chromatography", Journal of Chromatography A, 912 (2001) 31-38.

Yu et al., "Macroporous poly(glycidyl methacrylate-triallyl isocyanurate-divinylbenzene) matrix as an anion-exchange resin for protein adsorption", Journal of Chromatography A, 855 (1999) 129-136.

European Search Report dated Oct. 4, 2010, for European Application No. 06828214.4.

Vartuli, et al., Effect of Surfactant/Silica Molar Ratios on the Formation of Mesoporous Molecular Sieves: Inorganic Mimicry of Surfactant Liquid-Crystal Phases and Mechanistic Implications, Chemistry of Materials, 1994, vol. 6, No. 12, pp. 2317-2326.

Gan, et al., Microporous Polymeric Composites From Bicontinuous Microemulsion Polymerization Using a Polymerizable Nonionic Surfactant, Polymer, 1997, vol. 38, No. 21, pp. 5339-5345.

Chieng, et al. Microporous Polymeric Materials by Polymerization of Microemulsions Containing Different Alkyl Chain Lengths of Cationic Surfactants, Polymer, 1996, vol. 37, No. 13, pp. 2801-2809.

Zhou, et al., Synthesis of Macroporous Poly(Styrene-Divinyl Benzene) Microspheres by Surfactant Reverse Micelles Swelling Method, Polymer 2007, 48: pp. 1981-1988.

Zhou, et al., Synthesis of Macroporous Poly(Glycidyl Methacrylate) Microspheres by Surfactant Reverse Micelles Swelling Method, European Polymer Journal, 2007, 43: pp. 4493-4502.

Qu, et al., Chemical Modification and Characterization of Gigaporous Polystyrene Microspheres As Rapid Separation of Proteins Base Supports, Journal of Polymer Science Part A: Polymer Chemistry, 2008, 46: pp. 5794-5804.

Qu, et al., An Effective Way to Hydrophilize Gigaporous Polystyrene Microspheres As Rapid Chromatographic Separation Media for Proteins, Langmuir 2008, 24, pp. 13646-13652.

Qu, et al., A Novel Stationary Phase Derivatized From Hydrophilic Gigaporous Polystyrene-Based Microspheres for High Speed Protein Chromatography, Journal of Chromatography A, 1216 (2009) pp. 6511-6516.

* cited by examiner a. POROS®R1 medium    b. Self-made medium

US 8,940,172 B2

SUPER-MACROPOROUS POLYMERIC MICROSPHERES AND PREPARATION METHOD THEREOF

This application is a 371 U.S. National Phase of International Application PCT/CN2006/003242, filed Dec. 1, 2006 designating the U.S., and published in Chinese as WO 2008/064525 on Jun. 5, 2008.

FIELD OF THE INVENTION

The present invention relates to a method for manufacturing macroporous polymeric microspheres, and particularly, to super-macroporous polymeric microspheres with two pore distributions and the preparation method thereof, wherein the polymeric microspheres are especially suitable for being used as a bio-separation medium.

BACKGROUND

With the development of life sciences, the relevant biomacromolecule separation has become an extraordinary important task. At present, the separation and purification technology for preparing proteins in large scale has become a limiting factor in the development of biotecimology. In respective countries, a great deal of researches has been carried out on the aspect which has also become one of the emphases in technological investments.

Though the research on bio-separation media has been lasted for tens of years and the media have been greatly improved in the performances (such as, mechanical strength, application scope and service life) and separation ability thereof, it is still hard to harmonize the 3 factors such as resolution, capacity and separation speed. Especially for the biomacromolecules, because of their large volumes and changeful structures, the demand on the separation conditions is higher. However, the general synthesized porous media make use of the phase separation between cross-linked polymers and liquid lean solvents and non-solvents (referred to as diluents or pore-making agents) to form channels, and therefore, such a mechanism will necessarily result in pore diameters in nanometer grade (100-300 Å). As the pore diameters are relatively small, the mass transfer process of the mobile phase in the channels is accomplished mainly depending on molecule diffusion, which results in the slow mass transfer speed and long separation time for the biomacromolecules. In order to overcome this disadvantage, it is demanded imperatively to develop a new pore-forming method to prepare polymeric media with large pore diameters (10 or 20 times larger than the diameters of the biomacromolecules).

The above important demand and enormous market perspective make the research on the preparation and application of super-macroporous separation media draw much attentions in respective countries. The researchers in respective countries have developed the following several pore-making methods for preparing super-macroporous media.

(1) A suspension polymerization method taking polymers as pore-making agent: soluble polymers are used to replace the above liquid pore-making agents, see V. L. Sederel, G. J. De Jong, Styrene-divinylbenzene copolymers, Construction of porosity in styrene divinylbenzene matrices. J. Appl. Polym. Sci., 1973, 17, 9: 2835-2846. With the polymerization of the monomers in the liquid droplets, a phase separation occurs between the newly formed cross-linked polymers and the primary polymers being pore-making agent, and finally, relatively larger pore diameters can be obtained by extracting out the polymers being pore-making agent. However, because the phase separation degree between both polymers is large, it is difficult to form a continuous phase of the pore-making agent and therefore it is hard to obtain penetrated macropores. Additionally, it is also relatively difficult to extract completely the polymers as the pore-making agent by solvents.

(2) A nanoparticle condensation method: The media prepared using this method have been commercialized, which are referred as POROS Perfusion Chromatography media [U.S. Pat. No. 5,019,270, U.S. Pat. No. 5,228,989, U.S. Pat. No. 5,833,861]. At the end of 1980s, the POROS media have been used in the process of column chromatography separation. These materials have two kinds of pores: 6000-8000 Å of through pores and 800-1500 Å of diffusion pores. The liquid in the through pores can flow in a manner of convection, and thus the mass transfer speed thereof is fast; and the diffusion pores provide a sufficiently high specific surface area so as to ensure the adsorption capacity of the media; and additionally, because the distance between the through pores and the diffusion pores is short, the mobile phase can diffuse therein easily. The occurrence of this kind of media brought great inspiration to scientists at that time. However, the preparation of POROS media is relatively difficult: firstly, particles in nanometer grade are prepared, and then these small particles are "stuck" to form clusters and further congregated into particles in micron grade. The channels in the particles are constituted of the apertures among the small particle clusters. It can be seen from the above preparation method that, it is very difficult to control the pore diameters by controlling the irregular congregating state among the nanoparticles, which result in the poor repeatability of batches, low yield of products and expensive price for POROS media. Furthermore, the cohesive force among the nanoparticles is low such that the media is weak in strength, difficult to be loaded into a column, and liable to be broken during the application. Therefore, at present, the application of the POROS media is stagnant and if a new method can overcome the disadvantages thereof, it will bring new vitality to the perfusion chromatography.

(3) Taking inorganic particles as pore-making agent: Y. Sun et al prepared bulk-shaped polymers with a pore diameter of about 340 nm with a double pore-making agent method using solid particles and solvents, further ground them into sphere-shaped particles, and extended this method to sphere-shaped media (see Y. H. Yu, Y. Sun. Macroporous poly(glycidyl methacrylate-triallyl isocyanurate-divinylbenzene) matrix as an anion-exchange resin for protein adsorption, Journal of Chromatography A, 1999, 855: 129-136; M. L. Zhang, Y. Sun. Poly(glycidyl methacrylate-divinylbenzene-triallylisocyanurate) continuous-bed protein chromatography, Chromatography A, 2001, 912: 31-38; M. L. Zhang, Y. Sun. Cooperation of solid granule and solvent as porogenic agents novel porogenic mode of bioporous media for protein chromatography, Chromatography A, 2001, 922: 77-86; Y. Sun, M. L. Zhang, M. Bai et al. Chinese Patent Application No. 01118231.8). These super-macroporous media attained good results in separation application. They further found that, in order to obtain the through large pore diameters, the volume content of the inorganic particles should be 10-40%. However, though a high embedding ratio can be attained by embedding the hydrophilic inorganic particles into the hydrophilic agarose, the compatibility between most synthesized macromolecule materials (such as polystyrene and the like) and inorganic particles is poor. Therefore, it is difficult to embed a large amount of the inorganic particles into these materials completely.

(4) PolyHIPE, high internal phase emulsion polymerization: it was published in 1985 by Barby et al (see U.S. Pat. No.

4,522,953), wherein a great amount of water was dispersed into a monomer to prepare a W/O type emulsion. Because the volume of the internal aqueous phase exceeded 70%, it was referred as high internal phase emulsion (HIPE). A Bulk-shaped macroporous material was obtained by subjecting this HIPE to polymerization. Because the volume of the internal phases is high and the aqueous phases will be penetrated mutually after the polymerization, mutually penetrated macropores will be formed after drying. At the beginning of 1990s, a new super-macroporous sphere-shaped medium prepared based on the high internal phase emulsion polymer technology, that is, the so-called Magnapore Material, was disclosed in U.S. Pat. No. 5,583,162, U.S. Pat. No. 5,653,922, U.S. Pat. No. 5,863,957, U.S. Pat. No. 6,100,306, Chinese Patent Application No. 95193484.8 by Naihong Li et al. This kind of microsphere is characterized in that, the channels are regular, the pore diameters are relatively large, and the interconnected pores are obvious. This microsphere has a diameter of 50-300 μm, a pore diameter of 1-50 μm, a density of 0.05-0.2 g/cm$^2$, a porosity of 70-90% and a specific surface area of 2-30 m$^2$/g. The preparation method thereof is as follows: firstly, dispersing the internal aqueous phase into an oil phase to form a high internal phase emulsion (the internal aqueous phase has a volume exceeding 70%); then dispersing the high internal phase emulsion into an external aqueous phase to form a W/O/W emulsion; and carrying out a polymerization. Because the aqueous phase in the high internal phase emulsion has high volume content and poor stability, many factors, such as, the hydrophobicity/hydrophilicity and volume fraction of the monomers in oil phase, the kind and concentration of the surfactants, the viscosity of the continuous phase and the polymerization temperature, will affect the high internal phase emulsion. If the control is inappropriate, it is easy to cause emulsion breaking which results in that it is impossible to form microspheres.

These methods in the prior art all have the disadvantages of troublesome preparation method, complex formulation, poor controllability and inapplicability in large scale production. Additionally, the polymeric microspheres prepared by these methods are inadequate in mechanical strength and may be broken partially in actual application, which will affect the separation effect thereof.

DISCLOSURE OF THE INVENTION

Aiming at the above disadvantages existing in the prior art, the inventor has performed an extensive research and found that, by using the common suspension polymerization method, super-macroporous polymeric microspheres can be simply prepared by performing polymerization after adding a surfactant with a relatively content into an oil phase comprising a monomer and dispersing the obtained mixture into an aqueousphase. The super-macroporous polymeric microspheres are suitable for being used as a stationary phase matrix in liquid chromatography, a carrier for high performance catalysts and a high performance adsorbent, and especially, being used as a separation medium for separating biomacromolecules.

Hereby, the invention provides a method for preparing super-macroporous polymeric microspheres, which includes the steps of:

(1) Into a mixture of a monomer and a cross-linking agent, adding an initiator, a diluent and an oil-soluble surfactant to formulate an oil phase;

(2) Providing an aqueousphase;

(3) Mixing the oil phase and the aqueous phase to polymerize the monomer; and (4) Performing separation and drying to prepare the super-macroporous polymeric microsphere.

Furthermore, the invention further provides super-macroporous polymeric microspheres which comprise micropores with a pore diameter of 10-200 nm and super macropores with a pore diameter of 500-1000 nm, and preferably 500-900 nm in the interior thereof, wherein, the super macropores with a pore diameter of 500-900 nm comprise 10-60%, and preferably 20-40% of the inner pore volume of the microspheres, the particle diameter of the microspheres is 1-200 μm and the porosity thereof is 30%-90%.

As a preferable embodiment, the method for preparing a super-macroporous bio-separation medium in the invention includes the steps of:

(1) Into a mixture of a monomer and a cross-linking agent, adding an initiator (0.01 wt %-10 wt % of all the polymerizable monomers), a diluent (0 wt %-80 wt % of the oil phase) and a surfactant (5 wt %-80 wt % of the oil phase) and stirring until the initiator dissolves completely;

(2) Dissolving a stabilizer into distilled water to formulate a water solution with a certain concentration as an aqueous-phase;

(3) Adding the oil phase into the aqueous phase, stirring at a speed of 100-300 rpm, introducing nitrogen gas for 1 h, and performing polymerization under a temperature of 30-100° C. for 24 hours; and (4) After the completion of reaction, performing filtration, washing the obtained product with distilled water and ethanol for several times to remove the components of the diluent, the surfactant and the like, and after performing drying, the super-macroporous bio-separation medium is obtained.

The invention further provides super-macroporous polymeric microspheres which are characterized in that they comprise micropores with a pore diameter of 10-200 nm and super macropores with a pore diameter of 500-900 nm in the interior thereof, wherein, the super macropores with a pore diameter of 500-900 nm comprise 10-60%, and preferably 20-40% of the inner pore volume of the microspheres, the particle diameter of the microspheres is 1-200 μm and the porosity thereof is 30%-90%.

The invention further relates to uses of the super-macroporous polymeric microspheres for being as a stationary phase matrix in liquid chromatography, a medium for hydrophobic interaction, a cell carrier, a carrier for high performance catalysts and a high performance adsorbent, and especially, a use of the super-macroporous polymeric microspheres for being as a separation medium substrate in biomacromolecule separation.

DESCRIPTION OF THE PREFERRED EMBODIMENTS

Figure 1:
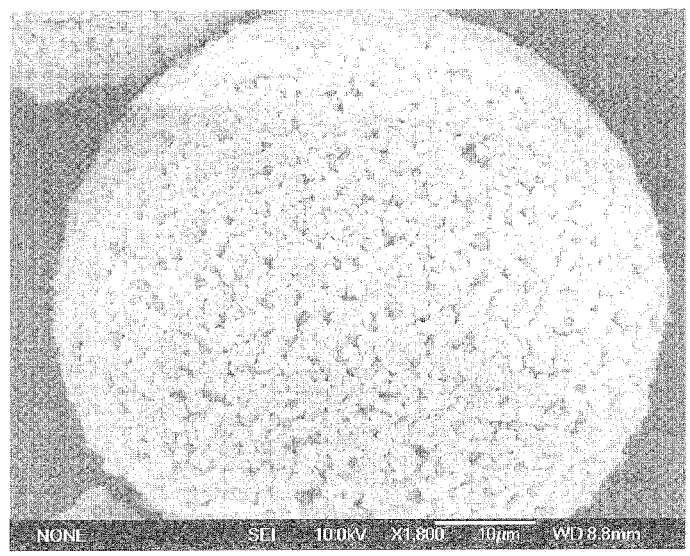
FIG. 1 is an electron microscope photograph of a kind of styrene-divinylbenzene polymeric microspheres in the invention, reaction condition: ST=35.0 g, DVB=15.0 g, BPO=2.0 g, HT=2.4 g, Span80=20.0 g.

In the invention, respective abbreviations have the following meanings:

Styrene (ST), divinylbenzene (DVB), glycidyl methacrylate (GMA), ethylene dimethacrylate (EGDMA), trimethylolpropane trimethyl acrylate (TRIM), benzoyl peroxide (BPO), sorbitan monooleate (Span80), para-octyl phenol polyoxyethylene ether (OP-10), heptane (HT), iso-octane (JO), polystyrene (PST), polyvinyl alcohol (PVA), high internal phase emulsion polymer (polyHIPE), water/oil/water emulsion (W/O/W emulsion).

Raw materials: styrene and divinylbenzene are commercial grade products (Beijing Chemical Reagents Company) and are subjected to vacuum distillation before use to remove inhibitors; benzoyl peroxide (with a water content of 25%, Beijing Chemical Reagents Company); heptane, analytical pure (Beijing Chemical Reagents Company); iso-octane, analytical pure (Beijing Chemical Reagents Company); Span80, chemical pure (Beijing Bangde Technology Co., Ltd., imported from Germany and individual packed in Beijing); polyvinyl alcohol (Kuraray, Japan); POROS R1 medium (Applied Biosystems, USA), ethanol (95%, ATOZ Fine Chemical Co., Ltd., Beijing); acetone, analytical pure (Beijing Chemical Reagents Company). Other raw materials used in the embodiments of the invention are all commercially available analytical pure products.

Apparatuses: JSM-6700F type scanning electron microscope (SEM, JEOL, Japan); AutoPore IV 9500 type mercury penetration apparatus (Micromeritics, USA); Mastersizer 2000E type laser particle size apparatus (Malvern Instruments Ltd., UK); Netzsch STA 449 TG-DTA/DSC type thermogravimetric analyzer (Netzsch, Germany); ÄKTA purifier (Amersham Biosciences, Uppsala, Sweden).

In the invention, unless specified otherwise, the term "super macropores" means pores with a pore diameter more than 500 nm.

The structures of the microspheres in the invention, such as, pore diameter, porosity and specific surface area or the like, can be controlled by adjusting the addition amounts of the surfactants, diluents and the cross-linking degree or the like. The method is not limited by the polymerization systems and an appropriate polymerization system can be selected according to the requirement.

In the invention, super-macroporous polymeric microspheres were prepared via suspension polymerization by adding relatively high content of a surfactant and appropriate amount of a diluent into an oil phase. The surfactant is an oil-soluble surfactant which can be sorbitan fatty acid ester, polyglycerol fatty acid ester, polyoxyethylene fatty acid ester, and alkyl phenol polyoxyethylene ethers, such as, sorbitan monooleate (Span80), paraoctyl phenol polyoxyethylene ether or the like. The content of the surfactant in the oil phase is 5%-80%, and preferably, in a range of 25%-60%. The surfactant forms a large amount of reverse micelles in the oil phase. After being dispersed into an aqueousphase, the surfactant reverse micelles in the liquid droplets of the oil phase absorb water spontaneously and swell into continuous channels. After the polymerization is completed, super-macroporous polymeric microspheres are obtained by washing the surfactant and the diluent out. The structures of the microspheres, such as, pore diameter, porosity and specific surface area or the like, can be controlled by adjusting the surfactants, diluents and the cross-linking degree or the like. The method is not limited by the polymerization systems and can prepare microspheres by selecting different monomers according to the requirement.

In the invention, the used monomer is any one of the oil-soluble vinyl-bearing monomers and the mixtures thereof, which can be ethylene type, styrene type, (meth) acrylic acid type, (meth)carylate type, (meth)acrylamide type monomers, and epoxy type monomers and vinyl-acetic ester type monomers or the like. The mass content of the monomer in the oil phase is 1%-90%, and preferably, in a range of 25%-45%. The cross-linking agent is any one of the oil-soluble divinyl or trivinyl bearing compounds, which can be the divinyl aromatic compounds, such as divinylbenzene (DVB); or the acrylate type compounds, such as ethylene dimethacrylate (EGDMA), trimethylolpropane trimethyl acrylate (TRIM) or the like. The mass content of the cross-linking agent in the oil phase is 1%-90%, and preferably, in a range of 10%-45%. The diluent in the oil phase is mainly used to restrain the secondary nucleation, and when the addition amount thereof is high, it also acts as a pore-making agent. It can make use of paraffins, such as, heptane, dodecyl, hexadecyl, iso-octane or the like; or ethers, such as petroleum ether or the like; or benzenes, such as toluene or the like. As to the diluent, it can further make use of the polymers which are soluble in the monomers. For example, for the styrene monomer, since the polymers of polystyrene, polymethacrylate or the like can be dissolved in styrene, the polymers of polystyrene, polymethacrylate or the like can be used as the diluent for the styrene system. Furthermore, for the glycidyl methacrylate (GMA) monomer, since the polymers of polyglycidyl methacrylate, polymethacrylate or the like can be dissolved in glycidyl methacrylate, the polymers of polyglycidyl methacrylate, polymethacrylate or the like can be used as the diluent for the glycidyl methacrylate system. The polymers soluble in the monomers are well-known to the researchers in the field. When there is no diluent being added into the oil phase, porous microspheres can also be obtained, and therefore, the mass content of the diluent in the oil phase is 0%-80%, however, preferably, 0%-50%. The polymerization initiator will affect the polymerization rate of the monomers so as to affect the finial yield of the microspheres, and therefore, appropriate initiator and the addition amount thereof should be selected. The polymerization initiator used in the invention can be the peroxide initiators, such as benzoyl peroxide; or azo type initiators, such as azobisisobutyronitrile; or the mixtures thereof. The addition amount of the oil-soluble polymerization initiators is 0.01%-10% by mass of all the polymerisable monomers.

The oil phase should be dispersed in the aqueous phase under stirring. The reaction device should provide a shearing force distribution as uniform as possible so as to make the microsphere size relatively uniform. The stirring speed will affect the size of the microspheres, and therefore, an appropriate stirring speed can be selected according to the demanded particle diameter. The stirring speed can be in a range of 10-1000 rpm, and preferably, in a range of 100-300 rpm. The volume ratio of the oil phase and the aqueous phase is 0.1-50%, and preferably, 1-50%.

In the aqueous phase, the selection of a stabilizer and a water-soluble surfactant with appropriate concentrations can help the liquid droplets of the oil phase disperse in the aqueous phase stably, and reduce or prevent the occurrence of a sticking sphere phenomenon. For the stabilizer, it can make use of the water-soluble polymers, such as polyvinyl alcohol, glutin, cellulose, polyvinylpyrrolidone or the like, and the content thereof is 0.1-10% by mass of the aqueous phase. For the water-soluble surfactant, it can make use of sodium lauryl sulfate, sodium lauryl sulfonate or the like, and the content thereof is controlled to be not more than 10% by mass of the aqueous phase.

After the polymerization is completed, the microspheres should be washed to remove the residual unpolymerized monomers, and the surfactant, diluent or the like. Generally, the microspheres should be washed with distilled water and ethanol for several times respectively and then extracted with acetone for 24 h. After the washing, a product is obtained by drying.

The super-macroporous polymeric microspheres prepared in the invention have a particle diameter of 1-200 µm and a porosity which can be controlled in a range of 30%-90%. In the interior of the microspheres, 10-60%, and preferably 20-40% of the pores are distributed in a range of 500-900 nm. This medium is suitable for being used as a stationary phase matrix in liquid chromatography, a carrier for high performance catalysts and a high performance adsorbent, and especially, is suitable for being used as a separation medium in biomacromolecule separation.

The super-macroporous polymeric microspheres of the invention have a breaking strength up to 20 MPa. For example, they can be loaded and used very effectively under a pressure of 10 MPa, and preferably 6 MPa without the occurrence of breakage. Therefore, the super-macroporous polymeric microspheres of the invention have a very high mechanical strength and will not be broken during the actual application. The separation effect thereof is excellent.

The above methods will be further described in view of the following examples, however, these methods are not limited to the provided examples.

Example 1

Figure 2:
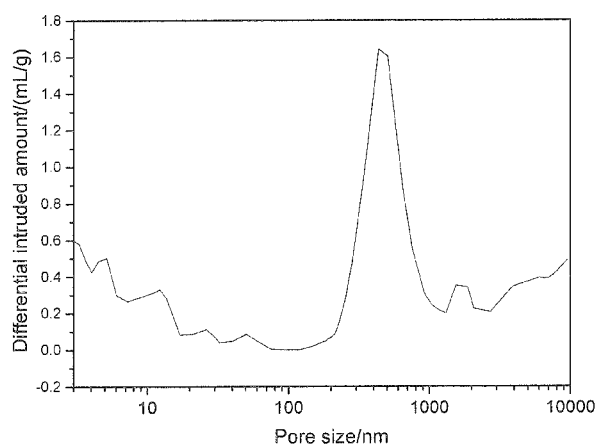
FIG. 2 is a graph of the pore diameter distribution of a kind of styrene-divinylbenzene polymeric microspheres in the invention, reaction condition: ST=35.0 g, DVB=15.0 g, BPO=2.0 g, HT=2.4 g, Span80=20.0 g.
Figure 3:
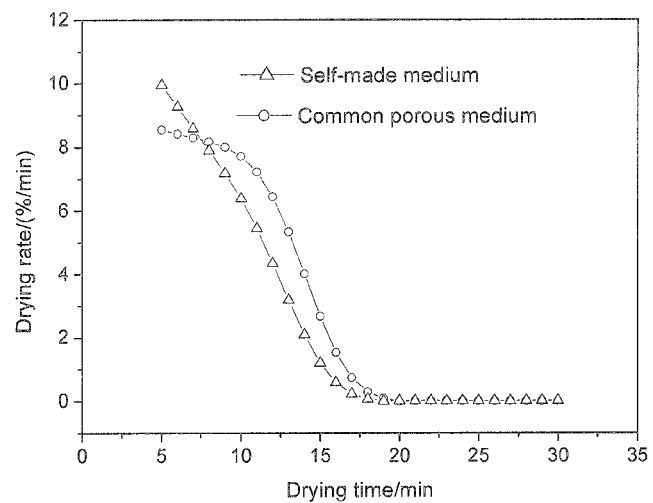
FIG. 3 is a comparative graph of the isothermal drying curves of the super-macroporous microspheres in the invention and the common porous microspheres.
Figure 4:
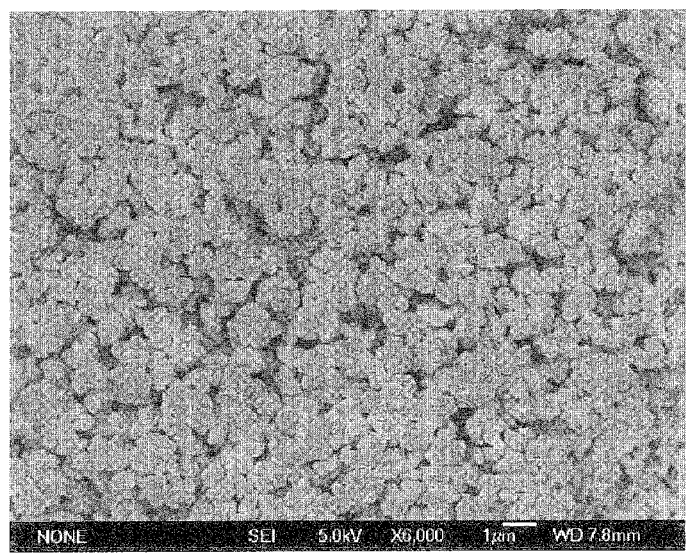
FIG. 4 is an electron microscope photograph of another kind of styrene-divinylbenzene polymeric microspheres in the invention, reaction condition: ST=35.0 g, DVB=15.0 g, BPO=2.0 g, HT=2.4 g, Span80=12.5 g.

With a Concentration of 40% for Surfactant 35.0 g styrene and 15.0 g divinylbenzene were weighted accurately and put into a 200 mL beaker, and 2.0 g benzoyl peroxide, 2.4 g heptane and 20.0 g Span 80 were added thereto. The obtained mixture was stirred until the initiator was dissolved completely. 1.0 g PVA was weighted and dissolved into 500 mL distilled water to formulate an aqueous-phase. The oil phase was added into the aqueous phase, stirred at a speed of 200 rpm and nitrogen gas was introduced for 1 h to perform polymerization for 24 h at 75° C. After the reaction was completed, the mixture was filtered and the obtained product was washed with distilled water and ethanol for several times to remove the components of the diluent, surfactant or the like. A product was obtained after drying. An electron microscope photograph of the obtained microspheres was shown in FIG. 1. The structure of the microspheres was characterized and the measured results were as follows: the specific surface area was 203.8 m$^2$/g, the porosity was 83.6%, the density was 0.31 g/mL, and in the interior of the microsphere, 30% of the pores were distributed in a range of 500-900 nm, as shown in FIG. 2. The microspheres were subjected to an isothermal drying curve analysis. It was found that the curve thereof had a linear descending stage (FIG. 3), which proved that the microspheres accorded with the characteristic of the open pore materials and the inner channels thereof were connected mutually which facilitated the inflow and outflow of liquid.

Example 2

With a Concentration of 25% for Surfactant 35.0 g styrene and 15.0 g divinylbenzene were weighted accurately and put into a 200 mL beaker, and 2.0 g benzoyl peroxide, 2.4 g heptane and 12.5 g Span 80 were added thereto. The obtained mixture was stirred until the initiator was dissolved completely. 1.0 g PVA was weighted and dissolved into 500 mL distilled water to formulate an aqueous-phase. The oil phase was added into the aqueous phase, stirred at a speed of 200 rpm and nitrogen gas was introduced for 1 h to perform polymerization for 24 h at 75° C. After the reaction was completed, the mixture was filtered and the obtained product was washed with distilled water and ethanol for several times to remove the components of the diluent, surfactant or the like. A product was obtained after drying. An electron microscope photograph of the obtained microspheres was shown in FIG. 4 and the measured porosity of the microspheres was 40%.

Example 3

Figure 5:
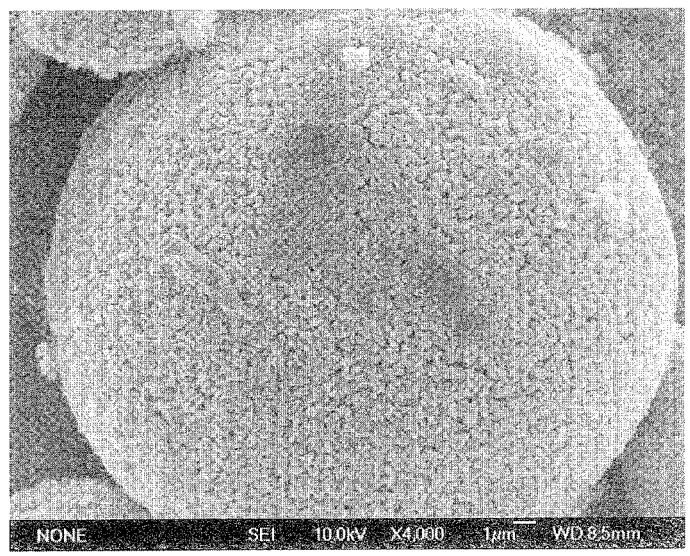
FIG. 5 is an electron microscope photograph of another kind of styrene-divinylbenzene polymeric microspheres in the invention, reaction condition: ST=35.0 g, DVB=15.0 g, BPO=2.0 g, HT=2.4 g, Span80=30.0 g.

With a Concentration of 60% for Surfactant 35.0 g styrene and 15.0 g divinylbenzene were weighted accurately and put into a 200 mL beaker, and 2.0 g benzoyl peroxide, 2.4 g heptane and 30.0 g Span 80 were added thereto. The obtained mixture was stirred until the initiator was dissolved completely. 1.0 g PVA was weighted and dissolved into 500 mL distilled water to formulate an aqueousphase. The oil phase was added into the aqueous phase, stirred at a speed of 200 rpm and nitrogen gas was introduced for 1 h to perform polymerization for 24 h at 75° C. After the reaction was completed, the mixture was filtered and the obtained product was washed with distilled water and ethanol for several times to remove the diluent, surfactant or the like. A product was obtained after drying. An electron microscope photograph of the obtained microspheres was shown in FIG. 5.

Example 4

Figure 6:
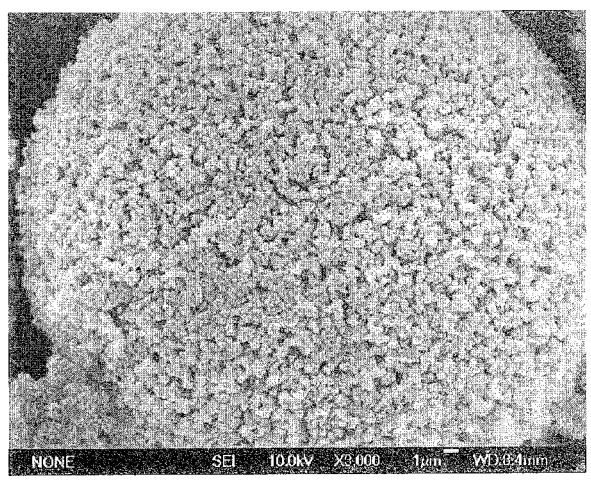
FIG. 6 is an electron microscope photograph of another kind of styrene-divinylbenzene polymeric microspheres in the invention, reaction condition: ST=35.0 g, DVB=15.0 g, BPO=2.0 g, HT=2.4 g, OP=10=20.0 g.

Changing Surfactant 35.0 g styrene and 15.0 g divinylbenzene were weighted accurately and put into a 200 mL beaker, and 2.0 g benzoyl peroxide, 2.4 g heptane and 20.0 g para-octyl phenol polyoxyethylene ether were added thereto. The obtained mixture was stirred until the initiator was dissolved completely. 1.0 g PVA was weighted and dissolved into 500 mL distilled water to formulate an aqueousphase. The oil phase was added into the aqueous phase, stirred at a speed of 200 rpm and nitrogen gas was introduced for 1 h to perform polymerization for 24 h at 75° C. After the reaction was completed, the mixture was filtered and the obtained product was washed with distilled water and ethanol for several times to remove the components of the diluent, surfactant or the like. A product was obtained after drying. An electron microscope photograph of the obtained microspheres was shown in FIG. 6.

Example 5

Figure 7:
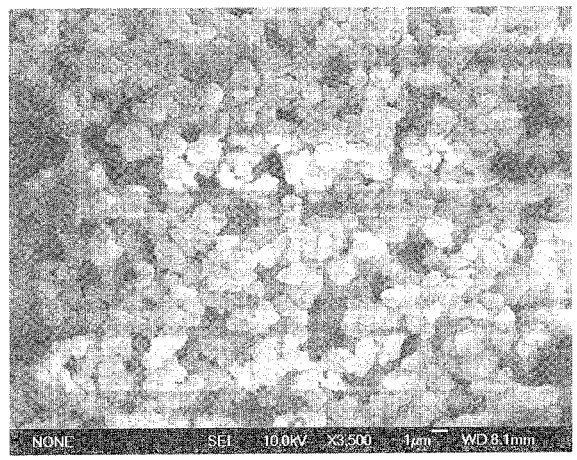
FIG. 7 is an electron microscope photograph of another kind of styrene-divinylbenzene polymeric microspheres in the invention, reaction condition: ST=37.5 g, DVB=12.5 g, AIBN=1.5 g, HT=2.4 g, Span80=25.0 g.

Changing Initiator 37.5 g styrene and 12.5 g divinylbenzene were weighted accurately and put into a 200 mL beaker, and 1.5 g azobisisobutyronitrile, 2.4 g heptane and 25.0 g Span 80 were added thereto. The obtained mixture was stirred until the initiator was dissolved completely. 1.0 g PVA was weighted and dissolved into 500 mL distilled water to formulate an aqueousphase. The oil phase was added into the aqueous phase, stirred at a speed of 200 rpm and nitrogen gas was introduced for 1 h to perform polymerization for 24 h at 75° C. After the reaction was completed, the mixture was filtered and the obtained product was washed with distilled water and ethanol for several times to remove the components of the diluent, surfactant or the like. A product was obtained after drying. An electron microscope photograph of the obtained microspheres was shown in FIG. 7. The measured porosity of the microspheres was 86% and the 500-900 nm super macropores comprised 60% of the inner pore volume of the microsphere.

Example 6

Figure 8:
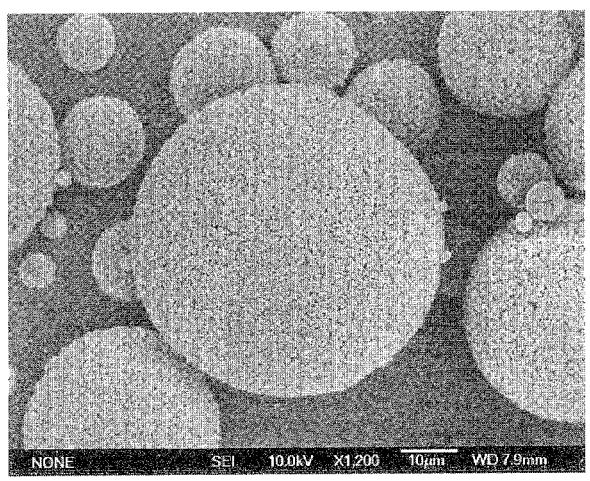
FIG. 8 is an electron microscope photograph of another kind of styrene-divinylbenzene polymeric microspheres in the invention, reaction condition: ST=25.0 g, DVB=25.0 g, BPO=2.0 g, HT=2.4 g, Span80=35.0 g.

Increasing Cross-Linking Degree 25.0 g styrene and 25.0 g divinylbenzene were weighted accurately and put into a 200 mL beaker, and 2.0 g benzoyl peroxide, 2.4 g heptane and 35.0 g Span 80 were added thereto. The obtained mixture was stirred until the initiator was dissolved completely. 1.0 g PVA was weighted and dissolved into 500 mL distilled water to formulate an aqueousphase. The oil phase was added into the aqueous phase, stirred at a speed of 200 rpm and nitrogen gas was introduced for 1 h to perform polymerization for 24 h under a temperature of 30-100° C. After the reaction was completed, the mixture was filtered and the obtained product was washed with distilled water and ethanol for several times to remove the components of the diluent, surfactant or the like. A product was obtained after drying. An electron microscope photograph of the obtained microspheres was shown in FIG. 8.

Example 7

Figure 9:
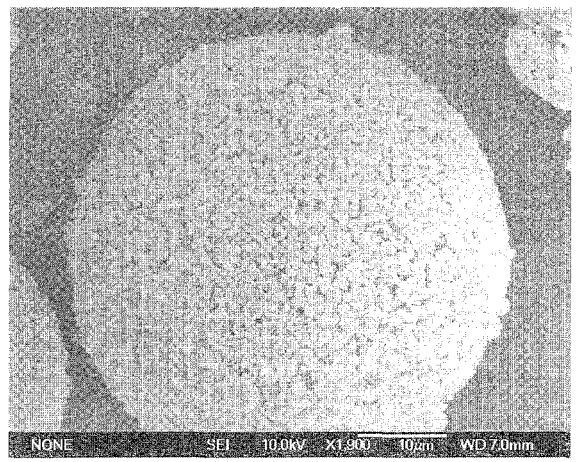
FIG. 9 is an electron microscope photograph of another kind of styrene-divinylbenzene polymeric microspheres in the invention, reaction condition: ST=35.0 g, DVB=15.0 g, BPO=2.0 g, HT=30.0 g, Span80=20.0 g.

Increasing Addition Amount of Diluent 35.0 g styrene and 15.0 g divinylbenzene were weighted accurately and put into a 200 mL beaker, and 2.0 g benzoyl peroxide, 30.0 g heptane and 20.0 g Span 80 were added thereto. The obtained mixture was stirred until the initiator was dissolved completely. 1.0 g PVA and 0.5 g sodium lauryl sulfate (SDS) were weighted and dissolved into 500 mL distilled water to formulate an aqueousphase. The oil phase was added into the aqueous phase, stirred at a speed of 200 rpm and nitrogen gas was introduced for 1 h to perform polymerization for 24 h at 75° C. After the reaction was completed, the mixture was filtered and the obtained product was washed with distilled water and ethanol for several times to remove the components of the diluent, surfactant or the like. A product was obtained after drying. An electron microscope photograph of the obtained microspheres was shown in FIG. 9.

Example 8

Figure 10:
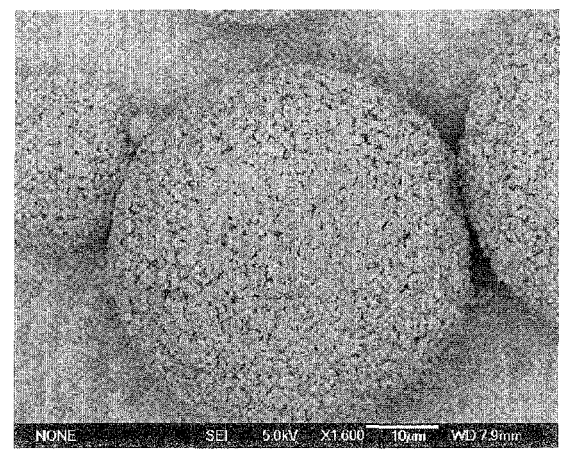
FIG. 10 is an electron microscope photograph of another kind of styrene-divinylbenzene polymeric microspheres in the invention, reaction condition: ST=35.0 g, DVB=15.0 g, BPO=2.0 g, Span80=20.0 g.

Without Diluent 35.0 g styrene and 15.0 g divinylbenzene were weighted accurately and put into a 200 mL beaker, and 2.0 g benzoyl peroxide and 20.0 g Span 80 were added thereto. The obtained mixture was stirred until the initiator was dissolved completely. 1.0 g PVA and 0.5 g sodium lauryl sulfate (SDS) were weighted and dissolved into 500 mL distilled water to formulate an aqueousphase. The oil phase was added into the aqueous phase, stirred at a speed of 200 rpm and nitrogen gas was introduced for 1 h to perform polymerization for 24 h at 75° C. After the reaction was completed, the mixture was filtered and the obtained product was washed with distilled water and ethanol for several times to remove the components of the diluent, surfactant or the like. A product was obtained after drying. An electron microscope photograph of the obtained microspheres was shown in FIG. 10.

Example 9

Figure 11:
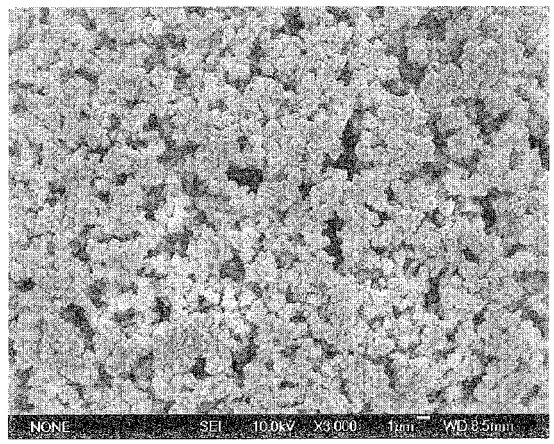
FIG. 11 is an electron microscope photograph of another kind of styrene-divinylbenzene polymeric microspheres in the invention, reaction condition: ST=35.0 g, DVB=15.0 g, BPO=2.0 g, PST=2.0 g, Span80=20.0 g.

Taking Polymer as Diluent 35.0 g styrene and 15.0 g divinylbenzene were weighted accurately and put into a 200 mL beaker, and 2.0 g benzoyl peroxide, 2.0 g polystyrene and 20.0 g Span 80 were added thereto. The obtained mixture was stirred until the initiator was dissolved completely. 1.0 g PVA and 0.5 g sodium lauryl sulfate (SDS) were weighted and dissolved into 500 mL distilled water to formulate an aqueousphase. The oil phase was added into the aqueous phase, stirred at a speed of 200 rpm and nitrogen gas was introduced for 1 h to perform polymerization for 24 h at 75° C. After the reaction was completed, the mixture was filtered and the obtained product was washed with distilled water and ethanol for several times to remove the components of the diluent, surfactant or the like. A product was obtained after drying. An electron microscope photograph of the obtained microspheres was shown in FIG. 11.

Example 9

Figure 12:
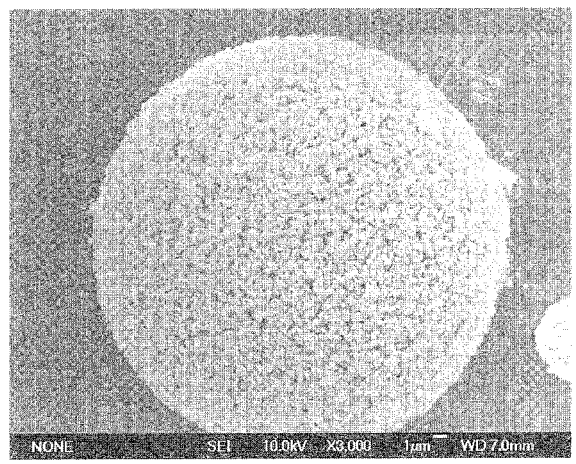
FIG. 12 is an electron microscope photograph of another kind of GMA-EGDMA polymeric microspheres in the invention, reaction condition: GMA=35.0 g, EGDMA=20.0 g, BPO=2.0 g, 10=15.0 g, Span80=25.0 g.

Changing Monomer System 35.0 g glycidyl methacrylate and 20.0 g divinylbenzene were weighted accurately and put into a 200 mL beaker, and 2.0 g benzoyl peroxide, 15.0 g iso-octane and 25.0 g Span 80 were added thereto. The obtained mixture was stirred until the initiator was dissolved completely. 1.0 g PVA and 0.5 g SDS were weighted and dissolved into 500 mL distilled water to formulate an aqueousphase. The oil phase was added into the aqueous phase, stirred at a speed of 200 rpm and nitrogen gas was introduced for 1 h to perform polymerization for 24 h at 75° C. After the reaction was completed, the mixture was filtered and the obtained product was washed with distilled water and ethanol for several times to remove the components of the diluent, surfactant or the like. A product was obtained after drying. An electron microscope photograph of the obtained microspheres was shown in FIG. 12.

Example 10

2.0 g commercially available POROS R1 medium and 2.0 g the self-made super-macroporous medium (the microspheres prepared in Example 1) pretreated under the same condition were weighted accurately and put into 200 mL stopper-equipped conical flasks respectively, and 40 mL isoflavone samples were added thereto. After being placed onto a water bath picking table at 25° C. and shook at 120 rpm for 24 h, the obtained mixtures were filtered and then eluted respectively by taking 40 mL 30% ethanol as an eluant to elute the respective resins. The total contents of isoflavone in the filtrates and the stripping liquids were analyzed by an ultraviolet spectrophotometer.

Figure 13:
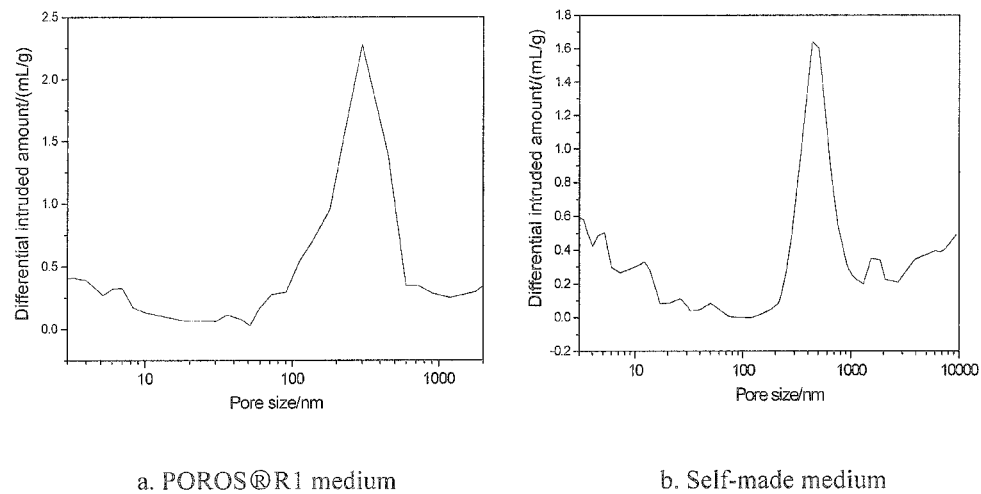
FIG. 13 are comparative graphs of the pore diameter distribution curves of POROS®R1 medium and the IPE medium in the invention.

The isoflavone adsorption capacity and the isoflavone desorption rate using 30% ethanol as an eluant of the POROS R1 medium were compared with those of the self-made super-macroporous medium (both media had a particle diameter of 50 μm) under the same condition, and the results were shown in Table 1. In the interior of the self-made super-macroporous medium, about 30% of the pores were dispersed in a range of 500-900 nm. By subjecting the POROS R1 medium to a characterization by mercury porosimetry, it was found that 18% of the pores in the interior of the microspheres were 500-900 nm pores. The pore diameter distribution curves of both media were shown in FIG. 13.

TABLE 1

The comparison of the adsorption and desorption performances of various resins

| Medium | Adsorption rate (%) | | Adsorption capacity (mg/mL) | | Desorption rate (%) | |
|---|---|---|---|---|---|---|
| | pH = 4.0 | pH = 8.0 | pH = 4.0 | pH = 8.0 | pH = 4.0 | pH = 8.0 |
| POROS | 42.3 | 69.1 | 4.2 | 7.9 | 76.1 | 70.5 |
| Self-made | 38.8 | 65.3 | 3.8 | 7.2 | 98.3 | 91.2 |

Example 11

Figure 14:
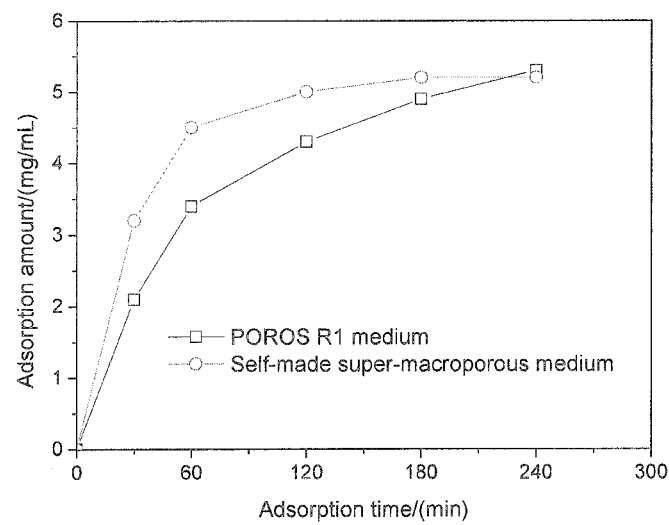
FIG. 14 is a comparative graph of the adsorption dynamic curves of isoflavone.

2.0 g POROS R1 medium and 2.0 g the self-made super-macroporous medium (the microspheres prepared in Example 1) (both media had a particle diameter of 50 μm) pretreated under the same condition were weighted accurately and put into 200 mL stopper-equipped conical flasks respectively, and 40 mL isoflavone samples were added thereto. The obtained mixtures were placed onto a water bath picking table at 25° C. and shook at 120 rpm. 0.5 mLs of the supernatant were sampled at different times to analyze the total isoflavone contents and calculate the adsorption capacities. The adsorption dynamic curves were plotted as shown in FIG. 14. The adsorption speeds were characterized by the adsorption dynamic curves of the media. As shown in FIG. 14, since the equilibrium time thereof was relatively short, the self-made super-macroporous medium was belonged to a type of rapid equilibrium and the mass transfer of the solutes in the interior of the resin was fast.

Example 12

Figure 15:
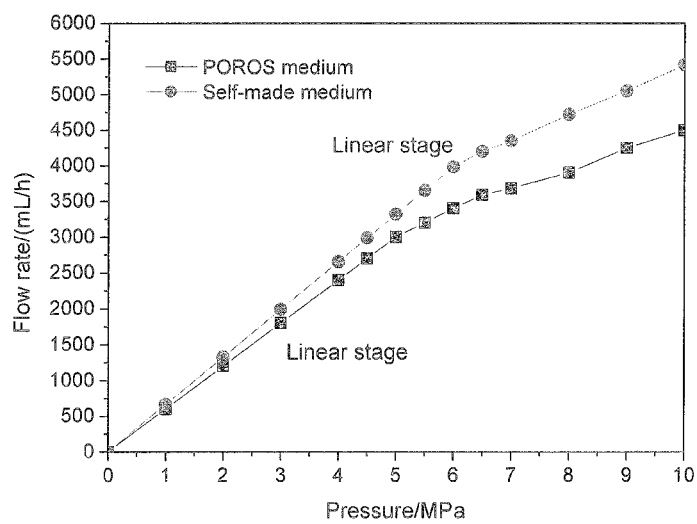
FIG. 15 shows a comparative graph of press-flow rate curves of the self-made medium in the invention and POROS medium.

The operating pressure was an important index for characterizing the performances of media and was generally measured by a pressure-flow rate curve. The pressure-flow rate curves of the self-made super-macroporous medium (the microspheres prepared in Example 1) and the POROS R1 medium were measured under the same condition and were shown in FIG. 15. The highest operating pressure of the self-made medium could be up to 10 MPa and 0-6 MPa was the optimal serviceable range.

Example 13

The breaking strength of the microspheres was measured using a high performance liquid chromatograph. Samples were obtained under different pressures and 500 balls were counted. The breaking numbers were recorded so as to calculate the breaking rate, as shown in Table 2. It could be seen from the data in the table that, the highest mechanical strength of the self-made medium (the microspheres prepared in Example 1) could be up to 20 MPa.

TABLE 2

The relationship between the pressure and the breaking rate

| | MPa | | | | |
|---|---|---|---|---|---|
| Pressure | 0 | 5 | 10 | 15 | 20 |
| Breaking rate (self-made microspheres)/% | 0.4 | 0.4 | 0.8 | 1 | 1 |

TABLE 2-continued

The relationship between the pressure and the breaking rate

| | MPa | | | | |
|---|---|---|---|---|---|
| Pressure | 0 | 5 | 10 | 15 | 20 |
| Breaking rate (POROS medium)/% | 0.4 | 0.6 | 1 | 2 | 10 |

Example 14

Figure 16:
FIG. 16 shows the rapid separation for 3 model proteins ((1) cytochrome C), (2) myoglobin and (3) ovalbumin).

The self-made super-macroporous medium (the microspheres prepared in Example 1) was loaded into a column and was used to perform separation for 3 model proteins. Experimental condition: 100×5 mm id, flow rate 10 mL/min, mobile phase: aqueous acetonitrile solution with a linear gradient of 20%-60%. model protein: (1) Cytochrome C, (2) myoglobin, (3) ovalbumin. The result indicated that the 3 model proteins could be separated in 2 min, as shown in FIG. 16.

The invention claimed is:

1. A method for preparing super-macroporous polymeric microspheres, which in the interior thereof comprising micropores with a pore diameter of 10-200 nm and super macropores with a pore diameter of 500-900 nm, wherein the super macropores comprise 10-60% of the inner pore volume of the microsphere, said method comprising:
   into a mixture of a monomer and a cross-linking agent, adding an initiator, a diluent and an oil-soluble surfactant to formulate an oil phase, wherein the surfactant forms a large amount of reverse micelles in the oil phase;
   mixing the oil phase and an aqueous phase to polymerize the monomer, wherein the reverse micelles of the surfactant in the liquid droplets of the oil phase absorb water spontaneously and swell into continuous channels; and
   performing separation and drying to prepare the super-macroporous polymeric microspheres.

2. The method according to claim 1, wherein the surfactant is selected from the group consisting of sorbitan fatty acid ester, polyglycerol fatty acid ester, polyoxyethylene fatty acid ester, alkyl phenol polyoxyethylene ethers, and mixtures thereof.

3. The method according to claim 1, wherein the surfactant is sorbitan monooleate.

4. The method according to claim 1, wherein the surfactant is para-octyl phenol polyoxyethylene ether.

5. The method according to claim 1, wherein the mass content of the surfactant in the oil phase is 5%-80%.

6. The method according to claim 1, wherein the mass content of the surfactant in the oil phase is 25%-60%.

7. The method according to claim 1, wherein the monomer is anyone selected from the group consisting of oil-soluble vinyl monomers and any mixtures thereof.

8. The method according to claim 1, wherein the mass content of the monomer in the oil phase is 1%-90%.

9. The method according to claim 1, wherein the monomer is at least one selected from the group consisting of ethylene type, styrene type, (meth)acrylic acid type, (meth)acrylate type, (meth)acrylamide type, epoxy type and vinyl acetate type monomers.

10. The method according to claim 1, wherein the mass content of the monomer in the oil phase is 25%-45%, the mass content of the cross-linking agent in the oil phase is 10%-45%, the mass content of the diluent in the oil phase is 0%-50%, and the mass content of the initiator in the oil phase is 0.01-10%.

11. The method according to claim 9, wherein the cross-linking agent is selected from the group consisting of divinylbenzene (DVB), ethylene dimethacrylate (EGDMA), trimethylolpropane trimethyl acrylate (TRIM) and any mixtures thereof.

12. The method according to claim 1, wherein the aqueous phase comprises a water-soluble stabilizer.

13. The method according to claim 1, wherein the cross-linking agent is at least one selected from the group consisting of oil-soluble divinyl bearing compounds, trivinyl bearing compounds and any mixture thereof.

14. The method according to claim 1, wherein the diluent is at least one selected from the group consisting of paraffins, alcohols, ethers, benzenes, polymers which are soluble in the monomer, and any mixtures thereof.

15. The method according to claim 1, the initiator is at least one selected from the group consisting of azo type initiators, peroxide initiators and any mixtures thereof.

16. The method according to claim 1, wherein the mass content of the cross-linking agent in the oil phase is 1%-90%.

17. The method according to claim 1, wherein the mass content of the diluent in the oil phase is 0%-80%.

18. The method according to claim 1, wherein the mass content of the initiator in the oil phase is 0.01%-10%.

19. The method according to claim 1, wherein the cross-linking agent is selected from the group consisting of divinyl aromatic compounds, acrylate type compounds and any mixtures thereof.

20. The method according to claim 1, wherein the diluent is at least one selected from the group consisting of heptane, dodecane, cetane, iso-octane, dodecyl alcohol, cyclohexanol, n-butanol, petroleum ether, toluene, polystyrene, poly(meth) acrylate, and any mixtures thereof.

21. The method according to claim 1, wherein the initiator is at least one selected from the group consisting of benzoyl peroxide, azobisisobutyronitrile, and any mixtures thereof.

* * * * *